Figures 1, 2, 3:
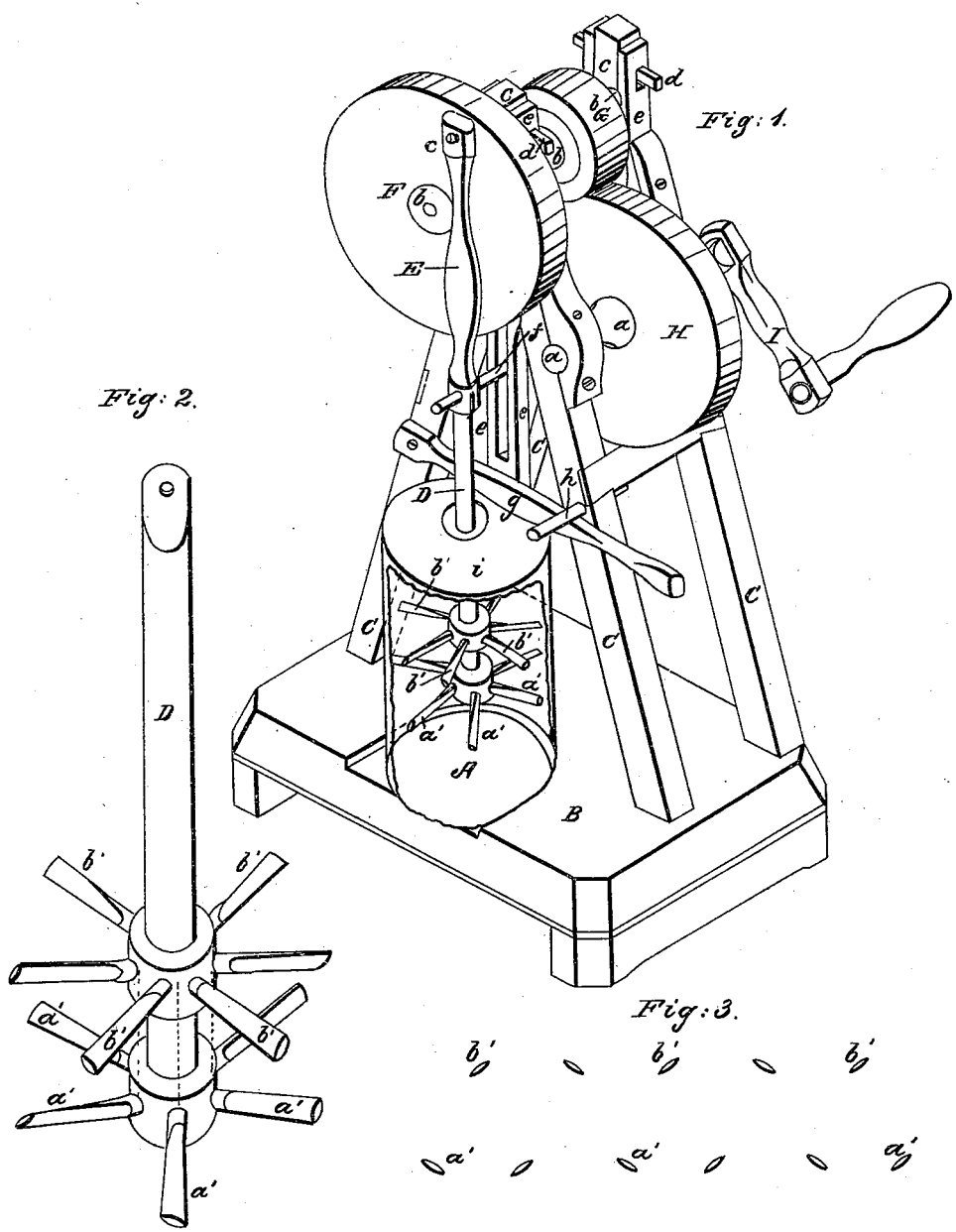

J. F. QUIMBY.
Churn.

No. 54,013.

Patented April 17, 1866.

Witnesses:
J. W. Porter
Daniel Smith Jr.

Inventor:
James F Quimby

UNITED STATES PATENT OFFICE.

JAMES F. QUIMBY, OF STETSON, MAINE.

IMPROVEMENT IN CHURNS.

Specification forming part of Letters Patent No. 54,013, dated April 17, 1866.

*To all whom it may concern:*

Be it known that I, JAMES F. QUIMBY, of Stetson, in the county of Penobscot and State of Maine, have invented a new and useful Churn; and I do hereby declare that the following is a full, clear, and exact description of the construction and operation of the same, reference being had to the accompanying drawings, and the letters of reference marked thereon, in which—

Figure 1 is a perspective view of the churn complete. Fig. 2 is a perspective view of the dash; and Fig. 3 is a side elevation, showing the ends of the radial arms of the dash projected in straight lines.

The nature of my invention consists in applying to vertical-working churns speed-wheels operated by a crank, the whole so constructed and arranged as to be more effective in operation and requiring less exertion of strength to drive them than when the churn is operated directly by the dash.

A represents the churn proper or creamholder, which may be of any pattern of vertical-working churns. B is a platform or base on which the churn rests. C C are two pairs of standards resting on platform B. Each pair of these standards are placed slanting or converging and unite at the top with centerpieces, as shown at *e e*. *b* is a shaft, which has its bearings in the upper part of the center-pieces *e e*. On shaft *b* are fixed balance-wheel F and elastic friction-pulley G. D is the dash. E is a connecting-rod attached to dash D by the pin *f* at its lower end and to wheel F by a wrist-pin at *c'*. H is a driving-wheel fixed on shaft *a*. The crank I is also attached to shaft *a*.

The elastic pulley G is in direct contact with wheel H, and the pressure of the pulley upon the wheel is adjusted by means of the wedge-keys *d*, which pass through center-pieces *e* and followers *c c*, the respective apertures being so arranged that the pressure of pulley G upon wheel H is graduated by sliding the keys *d*. The cover *i* of the churn is held in place by the hand-lever *g*, the lever being secured by pin *h*. The pin *f*, which connects the dash D with rod E, plays in a slot in center-piece *e*, as shown, thereby serving the purpose of a cross-head and keeping the dash in line with the axis of the churn. By actuating the crank I the wheel H is revolved, which imparts, by contact with pulley G, an accelerated motion to wheel F, and the rotary motion of this wheel imparts a vertical movement to the dash D by means of the rod E.

In order to effectually agitate the cream when churning and at the same time produce an easy movement of the dash through the cream, I insert two rows or series of radial arms around the dash, near the bottom, as shown at *a' a'* and *b' b'*, Figs. 2 and 3; and I also form the arms, feathering right and left alternately, in the same row or series, as shown at *a' a'* and *b' b'*, Figs. 2 and 3, the arms in each row or series being placed opposite the center of the spaces between the arms in the series above or below. By thus forming and arranging the arms the currents of the cream are constantly broken by being turned from their course both by the direct action of the arms as also by the cross-currents produced by the alternate feathering of the arms, which produces the desired agitation with but a trifling expenditure of force in driving the crank, the arms being also narrow and moving more readily through the cream than if placed with their blades horizontal. I usually employ eight arms in each row; but they may be varied to suit the size of the churn.

My improvement is applicable to every kind of vertical-acting churns, thus in most cases reducing its cost to the user, as dash-churns still largely predominate over all others.

I do not claim as new the friction-pulley G and driving-wheel H, as the same are well known and used for imparting power; nor do I claim the dash as new; but What I do claim is—

The combination of churn A, dash D, rod E, balance-wheel F, elastic friction-pulley G, driving-wheel H, and crank I, when the whole are arranged to operate substantially in manner as described and shown.

JAMES F. QUIMBY.

Witnesses:
T. W. PORTER,
DANIEL SMITH, Jr.